July 17, 1951   F. A. ARBOGAST   2,561,040
ARTIFICIAL FISH BAIT

Filed Feb. 23, 1949   2 Sheets-Sheet 1

INVENTOR.
FRED A. ARBORGAST, Deceased
NELLIE E. ARBORGAST, Executrix
BY William Cleland
Attorney July 17, 1951  F. A. ARBOGAST  2,561,040
ARTIFICIAL FISH BAIT Filed Feb. 23, 1949  2 Sheets-Sheet 2

INVENTOR.
FRED A. ARBORGAST, Deceased
NELLIE E. ARBORGAST, Executrix
BY
William Cleland
Attorney

Patented July 17, 1951

2,561,040

UNITED STATES PATENT OFFICE 2,561,040

ARTIFICIAL FISH BAIT

Fred A. Arbogast, deceased, late of Akron, Ohio, by Nellie E. Arbogast, executrix, Akron, Ohio, assignor to Fred Arbogast and Company, Inc., Akron, Ohio, a corporation of Ohio Application February 23, 1949, Serial No. 77,937

6 Claims. (Cl. 43—42.48)

This invention relates to artificial fish bait and in particular relates to artificial bait of the so-called popper type.

In the past popper baits have usually had elongated ovate or egg-shaped bodies provided with concave recesses in the forward faces thereof. These baits, however, have usually provided little more action than a pop and a splash when cast into the water and retrieved.

An object of the present invention is to provide a popper type bait which will not only have the usual pop and splash action when cast into the water, but which with each jerk of the line to retrieve the bait will have an additional pop as well as angular movement to one side or the other in a manner which is very attractive to fish life.

Other objects of the invention will be manifest from the following brief description and the accompanying drawings.

Figure 1:
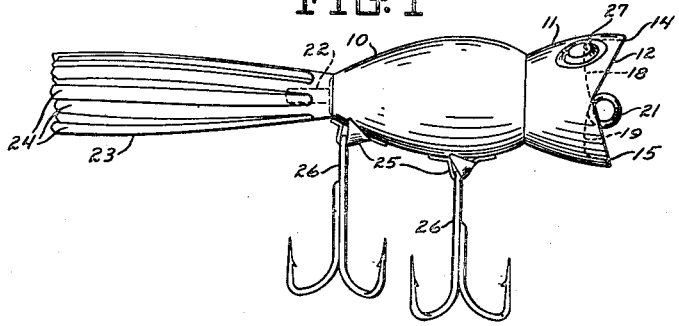
Figure 1 is a side elevation of an artificial popper-type bait, embodying the features of the invention.
Figure 2:
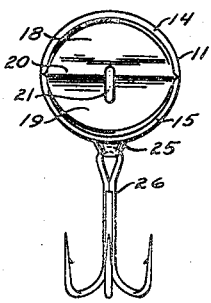
Figure 2 is a front end view of the bait, as viewed from the right of Figure 1.
Figure 3:
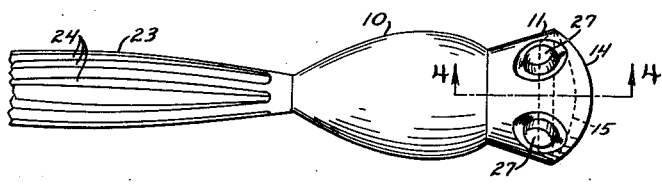
Figure 3 is a top plan view of the bait shown in Figure 1.
Figure 4:
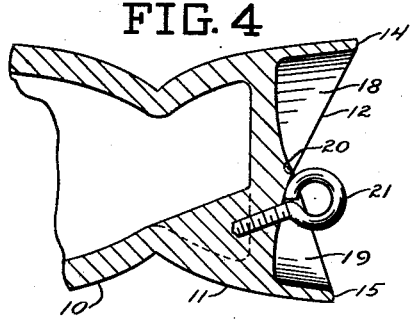
Figure 4 is an enlarged fragmentary cross-section of the bait taken substantially on the line 4—4 of Figure 3.

Referring to the drawings, the bait includes a substantially elongated ovate or egg-shaped body 10, having at the forward end, thereof, a head part 11. The head 11 is provided with a forwardly presented open mouth recess, to be described in greater detail later, and the outer portion of the head is forwardly flared from the body as shown, and connects with the body at a point of juncture which is substantially smaller in diameter than the points of maximum diameter of either the head or the body. As best shown in Figures 1 and 2 the widest portions of the head part are only slightly larger than widest portions of the body.

The mouth recess at the forward end of the bait defines oppositely arcuate, relatively thin, upper and lower flange portions 14 and 15, respectively, the upper flange portion projecting slightly more forwardly of the bait than the lower flange portion. The forward edges of the flange portions are rearwardly convergent from opposite top and bottom points of the same to apices adjacent a transverse central portion of the mouth recess, at opposite sides thereof, thereby defining V-openings 12 at said opposite sides. A ridge may be provided across said transverse central portion of the mouth recess, as indicated at 20. Individual inner wall surface portions in the mouth recess, above and below said ridge portion 20, define with said upper and lower flange portions 14 and 15, individual top and bottom pockets 18 and 19, of substantial depth, the deepest portions of the pockets being at the juncture of said inner wall surface portions and said top and bottom points of the flange portions.

Slightly below the ridge portion 20 a screw eye 21, has a shank 21a, thereof, into the head at a substantial angle to the longitudinal center line of the bait, downwardly and rearwardly thereof, and with a portion of said eye engaging the ridge portion 20. A fish-line 28 is attachable to the eye 21 in the usual manner.

Extending from body part 10, rearwardly thereof, may be an integral reduced shank 22, to which is attached an artificial buck-tail 23 of rubber or other suitable material, and of the type having streamers or strands 24, 24.

On the underside of the body part 10 may be attachments 25, 25 for pivotally mounting gang hooks 26, 26.

The bait body may be colored as desired for attracting fish in the water, and on the head portion a pair of eyes 27 may be painted or otherwise provided.

Figure 5:
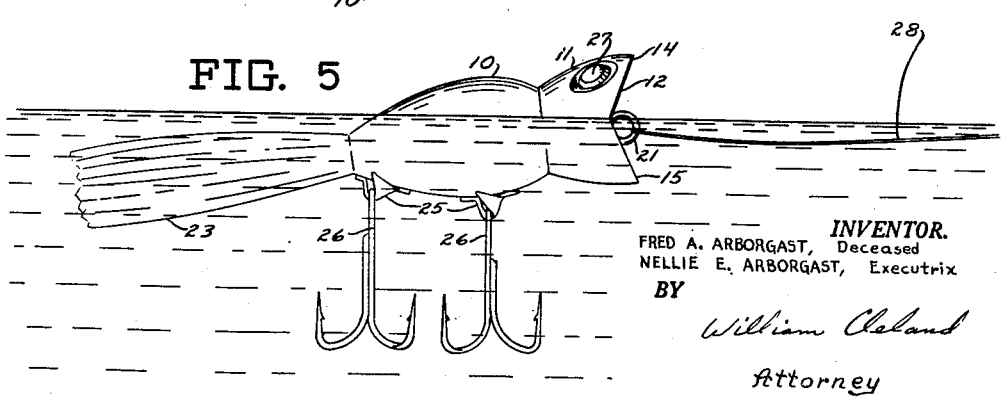
Figure 5 is a view similar to Figure 1, but illustrating the bait as it would float in water.
Figure 6:
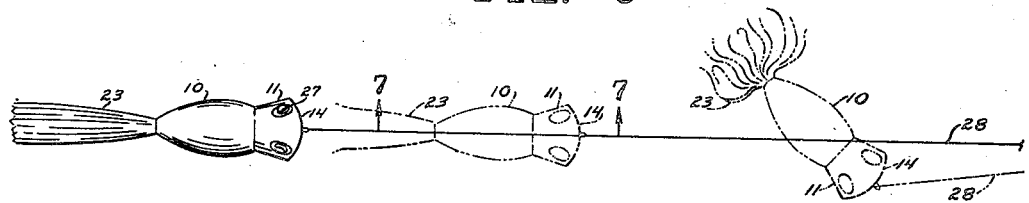
Figure 6 is a view, on a reduced scale, illustrating the action of the bait in the water as viewed from above.
Figure 7:
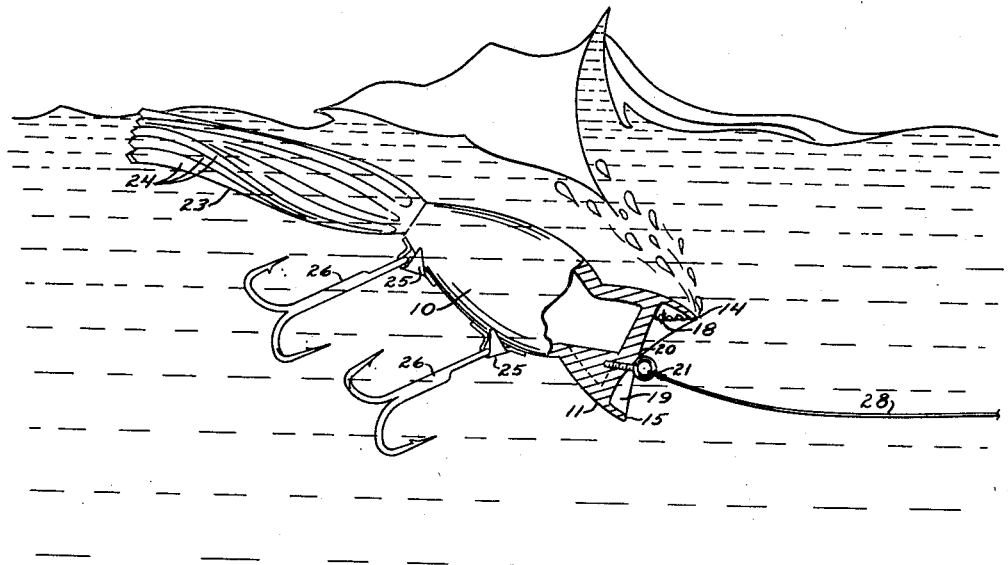
Figure 7 is a view similar to Figure 5 illustrating the action of the bait as it is retrieved by jerking action on the line.

In the use of the artificial bait described above it will when cast into the water usually strike the surface at a substantial angle thereto, tail down, with a splash and with a popping sound ostensibly caused by entrapment of air in lower pocket 19, after which the bait tends to assume a substantially horizontal, though almost completely submerged position, as shown in Figure 5. From the last-mentioned position the angler by lowering his rod to dip the line 28 may apply a short, steady jerk to the line to move the bait in a straight line forwardly, for say about eight inches. At the beginning of this retrieving stroke the line, due to the downward angle thereof adjacent the bait, will first pull the latter down an inch or so from the surface of the water, and in doing so a second popping sound is produced by entrapment of air in the upper pocket 18 (see Figure 7). Toward the end of said retrieving stroke the action of the water on the forward face of the bait is applied somewhat more on one side than the other, according to variations in the water pressure, and the bait is thereby caused to swing to a substantial angle with respect to said straight line forward movement (see chain-dotted position at right of Figure 6). The direction in which the bait will turn, however, is unpredictable.

The above-described action of the bait may be varied somewhat according to the skill of the angler.

Modifications of the invention may be resorted to without departing from the spirit thereof or the scope of the appended claims.

What is claimed is:

1. An artificial bait comprising a body having a head provided with a forwardly presented open mouth recess defining upper and lower flange portions, individual wall surface portions in said mouth recess above and below a transverse central portion thereof defining with said flange portions individual pockets, and the forward edges of said flange portions being rearwardly convergent from opposite top and bottom points of the flange portions to adjacent said transverse central portion at opposite sides of said mouth recess.

2. An artificial bait comprising a body having generally ovate form and provided with a forwardly flaring head connected to said body by an intermediate reduced neck, said head being provided with a forwardly presented open mouth recess defining upper and lower flange portions, individual wall surface portions in said mouth recess above and below a transverse central portion thereof defining with said flange portions individual pockets of substantial depth, and the forward edges of said flange portions being rearwardly convergent from opposite top and bottom points of the flange portions to adjacent said transverse central portion at opposite sides of said mouth recess.

3. An artificial bait comprising a body having generally ovate form and provided with a forwardly flaring head connected to said body by an intermediate reduced neck, said head being provided with a forwardly presented open mouth recess defining thin upper and lower flange portions, individual wall surface portions in said mouth recess above and below a transverse central portion thereof defining with said flange portions individual pockets of substantial depth, the forward edges of said flange portions being rearwardly convergent from opposite top and bottom points of the flange portions to adjacent said transverse central portion at opposite sides of said mouth recess, and said central portion being a ridge across the mouth recess between points of intersection of said convergent flange portions.

4. An artificial bait comprising a body having generally ovate form and provided with a forwardly flaring head connected to said body by an intermediate reduced neck, said head being provided with a forwardly presented open mouth recess defining thin upper and lower flange portions, individual wall surface portions in said mouth recess above and below a transverse central portion thereof defining with said flange portions individual pockets of substantial depth, the forward edges of said flange portions being rearwardly convergent from opposite top and bottom points of said flange portions to adjacent said transverse central portion at opposite sides of said mouth recess, said central portion being a ridge across the mouth recess between points of intersection of said convergent flange portions, and an eye provided with a shank, said shank extending into one of said surface portions to have a portion of the eye engaging said ridge.

5. An artificial bait comprising a body having generally ovate form and provided with a forwardly flaring head connected to said body by an intermediate reduced neck, said head being provided with a forwardly presented open mouth recess defining thin upper and lower flange portions, individual wall surface portions in said mouth recess above and below a transverse central portion thereof defining with said flange portions individual pockets of substantial depth, the forward edges of said flange portions being rearwardly convergent from opposite top and bottom points of the flange portions to adjacent said transverse central portion at opposite sides of said mouth recess, said central portion being a ridge across the mouth recess between points of intersection of said convergent flange portions, and said convergent flange portions defining a V-opening.

6. An artificial bait comprising a body having a head provided with a forwardly presented open mouth recess defining upper and lower thin flange portions, individual wall surface portions in said mouth recess above and below a transverse central portion thereof defining with said flange portions individual pockets of substantial depth, the forward edges of said flange portions being rearwardly convergent from opposite top and bottom points of the flange portions to adjacent said transverse central portion at opposite sides of said mouth recess, said central portion being a ridge across the mouth recess between points of intersection of said convergent flange portions, and an eye provided with a shank, said shank extending into one of said surface portions to have a portion of the eye engaging said ridge, and said convergent flange portions defining a V-opening.

NELLIE E. ARBOGAST,
Executrix of the Estate of Fred A. Arbogast, Deceased.

REFERENCES CITED

The following references are of record in the file of this patent:

UNITED STATES PATENTS

| Number | Name | Date |
|---|---|---|
| D. 147,101 | Adams | July 15, 1947 |
| 1,801,940 | Stanley | Apr. 21, 1931 |
| 2,069,972 | Schroeder | Feb. 9, 1937 |
| 2,218,280 | Deering | Oct. 15, 1940 |
| 2,295,765 | Weber | Sept. 15, 1942 |